United States Patent [19]

Anstine

[11] Patent Number: 4,759,902

[45] Date of Patent: Jul. 26, 1988

[54] USE OF ELECTROCHEMICAL POTENTIAL TO PREDICT RADIATION BUILDUP ON NUCLEAR REACTOR COOLANT PIPING

[75] Inventor: Larry D. Anstine, San Jose, Calif.

[73] Assignee: Advanced Process Technology, Milpitas, Calif.

[21] Appl. No.: 916,382

[22] Filed: Oct. 7, 1986

[51] Int. Cl.$^4$ ............................................. G21C 9/00
[52] U.S. Cl. ................................. 376/306; 376/245; 204/404
[58] Field of Search .............. 376/245, 253, 255, 259, 376/306; 204/400, 404, 416, 428, 429; 73/61.2

[56] References Cited

U.S. PATENT DOCUMENTS

| | | | |
|---|---|---|---|
| 4,512,921 | 4/1985 | Anstine | 252/626 |
| 4,532,103 | 7/1985 | Kitajuchi | 376/245 |
| 4,636,292 | 1/1987 | Fejes | 204/404 |
| 4,654,187 | 3/1987 | Fejes | 376/245 |

OTHER PUBLICATIONS

C. J. Wood, "Recent Developments in LWR Radiation Field Control", *Progress in Nuclear Energy*, Electric Power Research Institute, Jun. 1985.
R. A. Shaw & M. D. Naughton, "Radiation Control in Light Water Reactors", Proceedings of an International Conference on Water Chemistry of Nuclear Reactor System 2, Oct. 1980 (p. 32).
L. D. Anstine & M. D. Naughton, "Radiation Level Assessment and Control for Boiling Water Reactors", ibid (paper 50).
W. E. Berry & R. B. Diegle, "Survey of Corrosion Product Generation, Transport and Deposition in Light Water Reactors", Electric Power Research Institute, Mar. 1979 (EPRI NP-522).
L. D. Anstine, "BWR Radiation Assessment and Control Program: Assessment and Control of BWR Radiation Fields", Electric Power Research Institute, May 1983 (EPRI NP-3114, vol. 2) (Sec. 5).
L. D. Anstine, J. J. Zimmer & T. L. Wong, "BWR Corrosion-Product Transport Survey", Electric Power Research Institute, Sep. 1984 (EPRI NP-3687) (Entire Report).
W. J. Marble, "Control of Radiation-Field Buildup in BWRs", Electric Power Research Institute, Jun. 1985 (NP-4072) (Sec. 5).
EPRI, "BWR Radiation Control Handouts from EPRI Contractors Meeting", Electric Power Research Institute, Nov. 1985 (Cited Handouts).
R. S. Greeley, M. H. Lietzke, W. T. Smith & R. W. Stoughton, "Electromotive Force Studies in Aqueous Solutions at Elevated Temperatures, I., The Standard Potential of the Silver-Silver Chloride Electrode", *Journal of Physical Chemistry*, vol. 64, p. 652, 1980.
M. E. Indig & J. E. Weber, "Electrochemical Potential Measurements in a Boiling Water Reactor", Electric Power Research Institute, Nov. 1983 (EPRI NP-3362) (Secs. 3 & 4).
J. Leibovitz, W. R. Kassen, W. L. Pearl & S. G. Sawochka, "Draft-BWR In-Plant Measurements of Electrochemical Potentials", Electric Power Research Institute, May 1983 (EPRI NP-3521) (Secs. 3 and 4).
E. L. Burley, "Oxygen Suppression in Boiling Water Reactors-Phase 2", General Electric Company, Oct. 1982 (NEDC-23856-7) (Secs. 4.5.1–4.5.3, 4.5.4.3, 4.5.5.3).

*Primary Examiner*—Donald P. Walsh

[57] ABSTRACT

This invention relates to a method of predicting the long-term dose rates from radioactive material on the interior, wetted surfaces of the primary coolant piping of nuclear power reactors. The electrochemical potential of the cooling water of a nuclear power plant is measured over a short-term period with an electrochemical potential measuring device that has an unprefilmed measuring electrode. The results of these electrochemical potential measurements are divided by the result at a prescribed short period of exposure, and these normalized electrochemical potential fractions are plotted versus the logarithm of time. The negative of the slope of the straight line through the plotted data is divided into the measured average Co-60 concentration in the cooling water, and a standard curve of long-term dose rate versus this parameter is used to predict the eventual long-term radiation build-up performance of the nuclear power plant in which the electrochemical potential measurements are made.

7 Claims, 11 Drawing Sheets

USE OF ELECTROCHEMICAL POTENTIAL TO PREDICT RADIATION BUILDUP ON NUCLEAR REACTOR COOLANT PIPING

BACKGROUND OF THE INVENTION

1. Field of Invention

This invention pertains to the problem of the buildup of radioactive material on the wetted, interior surfaces of the primary cooling systems of water-cooled nuclear power reactors. These radiation fields are a major source of the radiation exposure to plant operating and maintenance personnel.

The buildup of radioactive material is due to the deposition of radioactive corrosion products on the piping surfaces. Although the internal corrosion of the primary coolant systems is usually insignificant from a structural standpoint, trace quantities of corrosion products are transported by the circulating coolant to the reactor core where they are deposited as a thin oxide film on the exterior surfaces of the metallic fuel rods. There, the corrosion products become radioactive as they are exposed to the intense neutron flux of the reactor core. Erosion, spalling, and dissolution of this oxide film return the radioactive corrosion products to the circulating coolant. They are subsequently deposited on and incorporated in the corrosion film of oxides on the interior surfaces of the cooling system piping outside the reactor vessel. Typically, the indigenous corrosion film contains greater than 85 percent of the radioisotopes on the out-of-core surfaces; thus, incorporation in the indigenous corrosion film controls the long-term build-up levels.

2. Description of the Prior Art

The nuclear power industry has been conducting an extensive program of research, analysis, and radiation and chemical measurements to develop a fundamental understanding of the chemical, physical, and nuclear processes that comprise this radiation build-up cycle (1–3)*. The literature prior to 1973 reviewed by Berry and Diegle (4), and the results of a major program sponsored by the Edison Electric Power Institute was described by Anstine (5). These studies have been concerned with:

*References to the prior art are listed in the end of this application

1. The corrosion of the cooling system interior surfaces.
2. The release and transport of corrosion products to the core.
3. The deposition, activation, and release from the fuel surfaces.
4. The transport to and deposition on the piping surfaces.

The intent has been to use this fundamental understanding of the process mechanisms to devise new plant operating conditions, piping materials, or coolant chemistries that will reduce and possibly even invert the radiation build-up rates.

A major obstacle to the development of a complete understanding of these fundamental phenomena has been the absence of a definitive, short-term test for how significant the long-term radiation buildup will be under a specific set of laboratory or plant conditions. By analogy, the house paint manufacturers would have a difficult time improving the weather resistance of their formulations if they had to wait for years of weathering to assess the effect of a proposed ingredient.

Lacking a reliable short-term measurement, the investigators of nuclear plant radiation buildup have been forced to compare massive amounts of scattered plant data with the limited results of a few laboratory studies. The plant data have been gathered under widely varying measurement, plant, and materials conditions and have covered many years of plant operation. Although the laboratory conditions have been more controlled, it has been difficult to make them representative of the plant conditions. Also the laboratory tests are usually conducted for a duration of no more than a few months. Correlations between the parameters that could affect build-up rates are difficult to find in the maze of plant data (6), and any proposed fixes resulting from the laboratory work have had to be implemented without waiting for the results of long-term plant verification testing.

There is general agreement that very little corrosion product transport and radiation buildup occurs when a power plant is not operating. Therefore, it is convenient to consider effective full-power time rather than calendar time when these processes are examined. FIG. 1 shows the buildup of the dose rates from the recirculation system piping at boiling water reactors (1).

The exact cause of the large variation among plants remains a major unsolved problem. If the data points for each plant are connected by lines, the dose rates in over 90 percent of the plants increase for the first 4 to 5 effective full-power years and then level off (3,6).

A review of the data indicated to me there are five key data correlations that provide an insight into a technique for assessing radiation build-up effects. These are presented in graphical form in FIGS. 2 through 6.

The first data correlation is shown in FIG. 2. For those plants where radiochemical measurements of the concentrations of isotopes in the cooling water have been published, the leveled-off (equilibrium) dose rate is plotted versus the average soluble Co-60 concentration in the cooling water. The datum for Hatch-2 was taken from reference 7 and for Dresden-2 from reference 8; all other data are from reference 6. This correlation indicates the long-term dose rate is approximately proportional to the Co-60 concentration in the water. This is to be expected, since Co-60 is the dominant gamma-emitting isotope contributing the dose rates from the coolant pipes. Unfortunately, the data are badly scattered. This scatter indicates the long-term dose rates may depend on the cooling water Co-60 concentration, but they are significantly impacted by other parameters that vary between plants.

The second data correlation is shown in FIG. 3. For those plants where significant data have been taken, the leveled-off (equilibrium) dose rate is plotted verses the dose rate at the end of the first fuel cycle (about 1.23 effective full-power years for U.S. boiling water reactors and 0.8 effective full-power year for foreign boiling water reactors). This correlation indicates that the long-term (equilibrium) dose rate is determined primarily during the first fuel cycle (6). At Monticello and Tsuruga, atypical events have occurred that offer explanations for the deviations of these two data points.

The third data correlation is graphed in FIG. 4. The data were derived from Co-60 build-up measurements taken from six coupons inserted in an experimental test loop at the Hatch-2 plant (5). The loop provided for the continuous circulation of actual recirculation system water at near reactor temperatures over the stainless steel coupons. Although the coupons are from three different fabrication lots, the minor differences in fabrication processes and alloy compositions would not be expected to have produced the widely different Co-60 build-up rates. However, the Co-60 concentration, pH, and conductivity in the Hatch-2 cooling water varied considerably during the period when these tests were conducted. Clearly, the initial build-up rates (less than 500 hours) and the long-term (6000 hours) activity levels are strongly influenced by the reactor water conditions during the period just after coupon insertion. If the water conditions are different, the buildup will be different.

The fourth data correlation is shown in FIGS. 5 and 6. It was also derived from the Hatch-2 loop data. The graphs compare the Co-60 build-up curves for two of the coupons with the build-up curve of total corrosion products (elemental weight per unit area) on these coupons. It is clear that the activity growth tracks the film growth during the first two months of exposure.

The fifth data correlation I recognized is that the shape and size of the grains or particles of oxide that comprise the corrosion films are related to the dose rates from those films. At Quad Cities-1, Nine Mile Point-1, and Millstone, where the dose rates started high and leveled off high, the film particles were found to be small and irregularly shape. At Shimane, Vermont Yankee, and Brunswick-2, where dose rates were initially lower and leveled off at lower values, the particles were large single crystals with sharp edges and faces. These data are presented in reference 6.

The five data correlations indicate the water chemistry conditions present during the initial formation of the oxide film are extremely important. These conditions determine the film morphology, which controls the long-range incorporation rate. Consequently, the initial corrosion process is of prime interest.

Corrosion is the destruction of a metal by an electrochemical action at its surface. This electrochemical action always consists of two separate electrode reactions that give rise to the flow of electrons. The anodic reaction is the oxidation of metal to form metal ions:

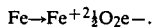
$$Fe \rightarrow Fe^{+2} + 2e-.$$

If the water contains dissolved oxygen and has a neutral pH (as in the cooling water of a boiling water reactor) some of the ferrous ion may be oxidized:

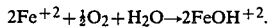
$$2Fe^{+2} + \tfrac{1}{2}O_2 + H_2O \rightarrow 2FeOH^{+2}.$$

The electrons from the anodic reaction flow through the metal to a nearby location where they combine with oxygen and water in the cathodic reaction:

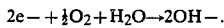
$$2e- + \tfrac{1}{2}O_2 + H_2O \rightarrow 2OH-.$$

The ferrous and ferric ions combine with the hydroxide ions to form magnetite:

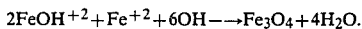
$$2FeOH^{+2} + Fe^{+2} + 6OH- \rightarrow Fe_3O_4 + 4H_2O.$$

Therefore, three times the sum of the anodic and cathodic reactions plus the ferrous ion oxidation reaction gives the net film formation reaction:

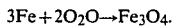
$$3Fe + 2O_2O \rightarrow Fe_3O_4.$$

These chemical processes are shown schematically in FIG. 7.

Depending on the pH and the relative concentrations of dissolved hydrogen and oxygen in the water, a cathodic reaction involving the reduction of hydrogen ions can also be significant:

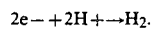
$$2e- + 2H+ \rightarrow H_2.$$

However, the production of an oxide film is still the overall result.

While the absolute potential of the anodic/cathodic reaction cannot be measured directly, this potential can be measured relative to a reference potential created by a reference electrode. The standard hydrogen electrode is, by convention, assigned a potential of zero at all temperatures. However, the standard hydrogen electrode would be difficult to use in some environments, such as the high temperatures and pressures of nuclear reactor cooling systems. A secondary standard electrode, calibrated against the standard hydrogen electrode, is used instead. A silver/silver chloride electrode, enclosed in a Teflon chamber filled with a 0.01 molal potassium chloride solution saturated with silver chloride, serves well for this purpose. The liquid junction is an asbestos wick. The standard potential for such a Ag/AgCl electrode has been determined by Greeley (9) for temperatures up to 300° C. Loss of KCl through the liquid junction and the increasing AgCl solubility with increasing temperature can be problems for long-term electrochemical potential measurements but not for short-duration electrochemical potential measurements.

The driving force for corrosion is the electrochemical potential difference from the metal surface to the solution. A potential drop occurs across the metal/oxide interface, through the oxide, and across the oxide/solution interface. To maintain the electric field, as the film grows, the potential must also grow. Therefore, the electrochemical potential of the measuring electrode tracks the growth of the oxide film on that electrode.

In all previous applications of electrochemical potential measurements to nuclear reactor coolant systems, the interest has been in electrochemical potential the corrosion film that forms on the measuring electrode is well established and growing very slowly. Then the electrochemical potential indicated by the device will be unaffected by the characteristics of the growing film over the duration of the measurements. The electrochemical potential measuring and reference electrodes have been allowed to remain in the coolant for several weeks or months before measurements are made to assure the measuring electrode is adequately prefilmed.

It is an object of this invention to make electrochemical potential measurements of the coolant of a nuclear reactor with an unprefilmed measuring electrode so the measurements will be affected by the characteristics of the growing film.

It is another object of this invention to provide a method for reliably predicting what the long-term radiation levels of nuclear reactor coolant piping will be if the coolant conditions are sustained.

Other objects and advantages of this invention will become apparent to a person skilled in the art from a reading of the accompanying drawings described immediately hereafter, the description of the invention, and the appended claims. It is to be understood, however, that the invention is not limited to the embodiment illustrated and described since it may be embodied in various forms within the scope of the appended claims.

SUMMARY OF THE INVENTION

A method has been developed to predict the long-term build-up rates of radioactive materials on the interior, wetted surfaces of the primary coolant piping of a nuclear reactor by measuring, over a short-term period, the electrochemical potential of the coolant water using an electrochemical potential measuring device with an unprefilmed electrode. This invention is based on the discovery of a correlation between the long-term dose rates from the coolant piping and the short-term rate of change of the electrochemical potential measured using an electrochemical potential measuring device with an unprefilmed measuring electrode. By discovering the correlation, I discovered unexpectedly how such electrochemical potential measurements, made in the unique unprefilmed condition over a short-term period at nuclear power plants or during laboratory experiments, can be used to provide a reliable indication of what the long-term radiation dose rates will be.

The invention comprises using an electrochemical potential measuring device with a measuring electrode made of the same metal as the corroding surface, but this electrode is not prefilmed. It is crucial that the electrochemical potential measurements be taken immediately and during a period immediately after the electrochemical potential device is immersed in a continuously flowing sample of the nuclear reactor coolant. The logarithmic rate of change of the electrochemical potential can be determined from the measurements. I have developed a standard curve that relates the measured cooling-water Co-60 concentration, divided by the negative of this logarithmic rate, to the long-term radiation levels to be expected from the corrosion films on the interior surfaces of the cooling system piping.

BRIEF DESCRIPTION OF THE DRAWINGS

FIG. 1 shows the buildup of the dose rates from the recirculation piping at boiling water reactors. FIG. 2 shows the correlation between leveled-off (equilibrium) dose rates and the average soluble Co-60 concentrations in the cooling water of boiling water reactors. FIG. 3 shows the correlation between the leveled-off (equilibrium) dose rates and the first fuel-cycle dose rates from the cooling systems of boiling water reactors. FIG. 4 shows the correlation between initial build-up rates and long-term activity levels on coupons exposed to Hatch-2 cooling water. FIGS. 5 and 6 show the correlation between activity growth and film growth on these coupons. FIG. 7 provides a schematic representation of the chemical processes of corrosion of an iron surface by water containing dissolved oxygen.

In the published literature, there is very little electrochemical potential data that cover a short period after the unprefilmed measuring electrode of an electrochemical potential measuring device has been exposed to reactor water. The only such data in the public domain of which I am aware are measurements made at Hatch-2 in February of 1981 (10), at Dresden-2 in 1975 (11), and at Vermont Yankee during 1980 through 1982 (11). These measurements were made with the reactors at full power. Therefore, the reactor cooling water contained about 200 ppb of dissolved oxygen (the norm for boiling water reactor recirculation lines). Some additional electrochemical potential measurements were made at Dresden-2 in 1982 during a test when hydrogen gas was added to the feedwater (12). The addition of hydrogen suppressed the radiolysis of water and lowered the dissolved oxygen concentration in the reactor cooling water to less than 20 ppb. This change in the concentration of oxygen lowered all the electrochemical potential data by a few hundred millivolts (10). Nevertheless, the hydrogen test data are shown in FIG. 8 along with the other three normal-chemistry data sets.

Figure 9:
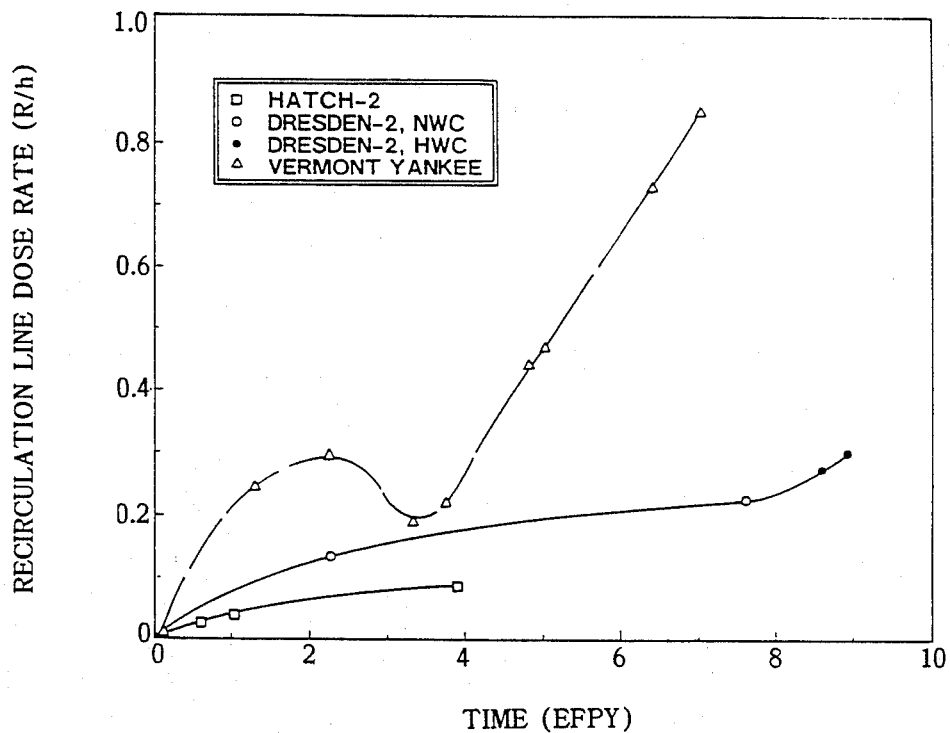

Radiation build-up data for these three plants are shown in FIG. 9. The data for Hatch-2 and Dresden-2 were taken from reference 6; the data for Vermont Yankee were taken from reference 8. There are no long-term radiation dose-rate data for the hydrogen-injection condition at Dresden-2 because the change was not made until 1982.

Figure 1:
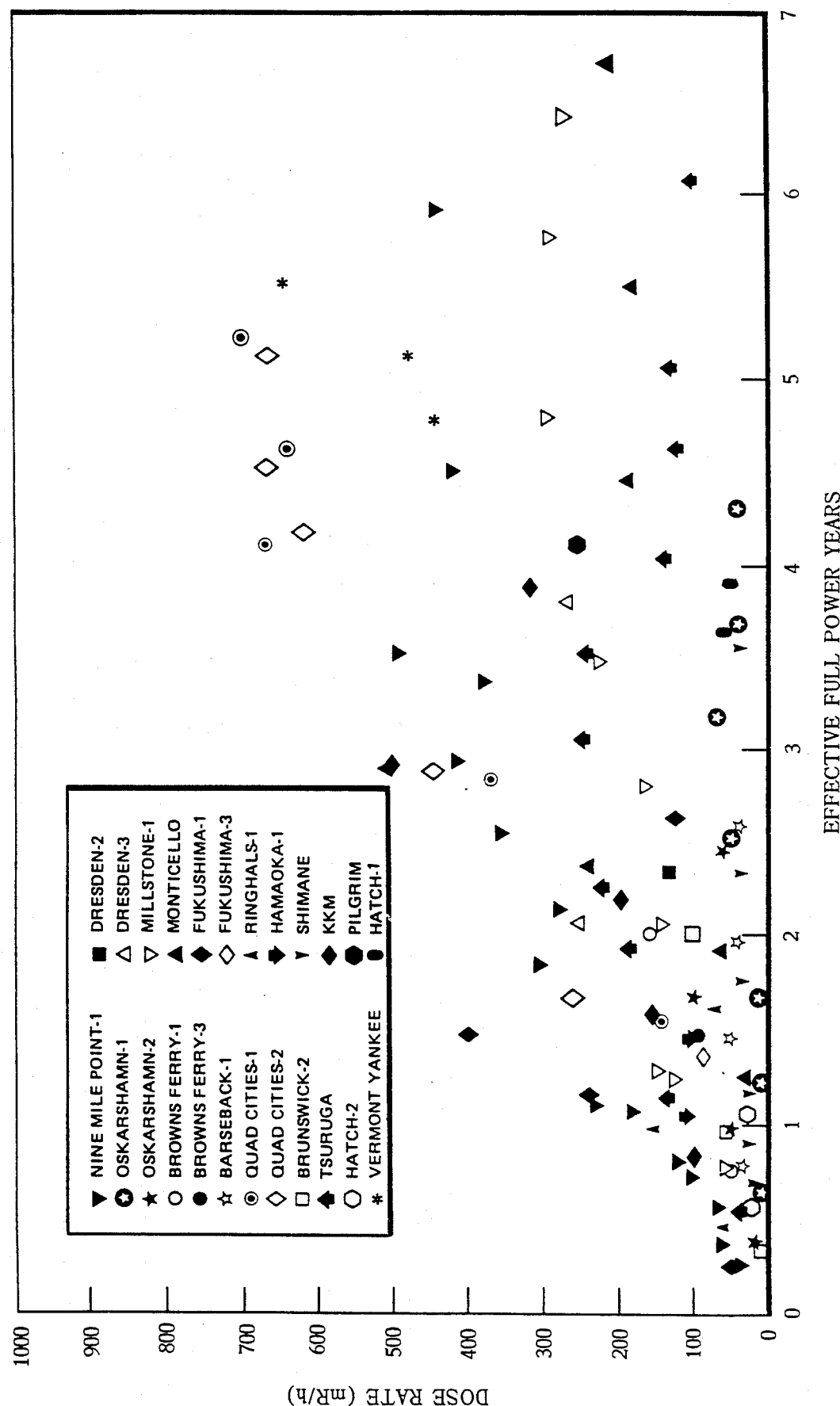
FIGS. 1 through 7 are included to present the concepts and correlations that were available to me in the prior art.
Figure 2:
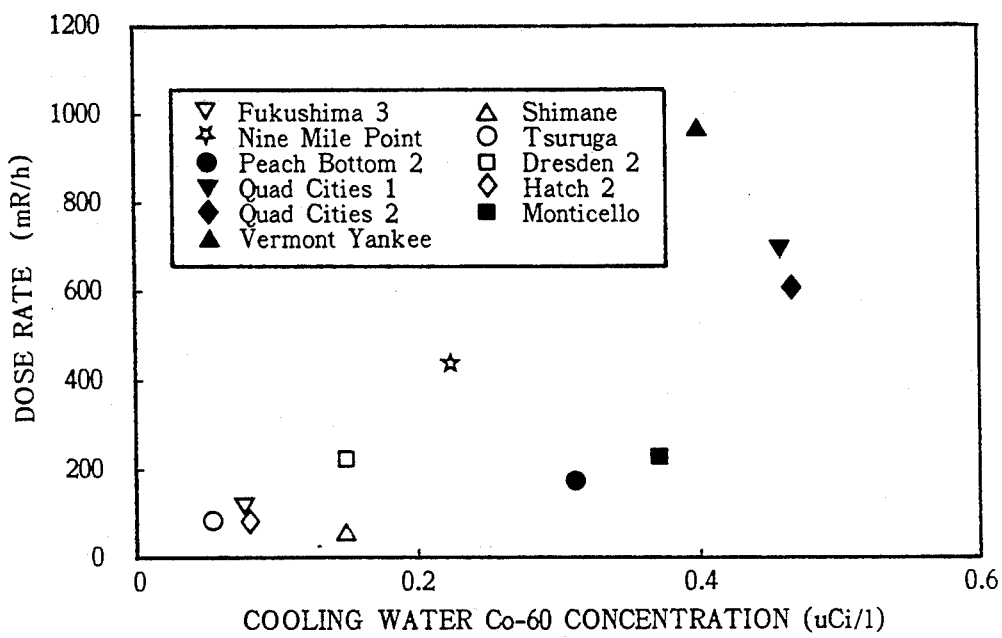
Figure 3:
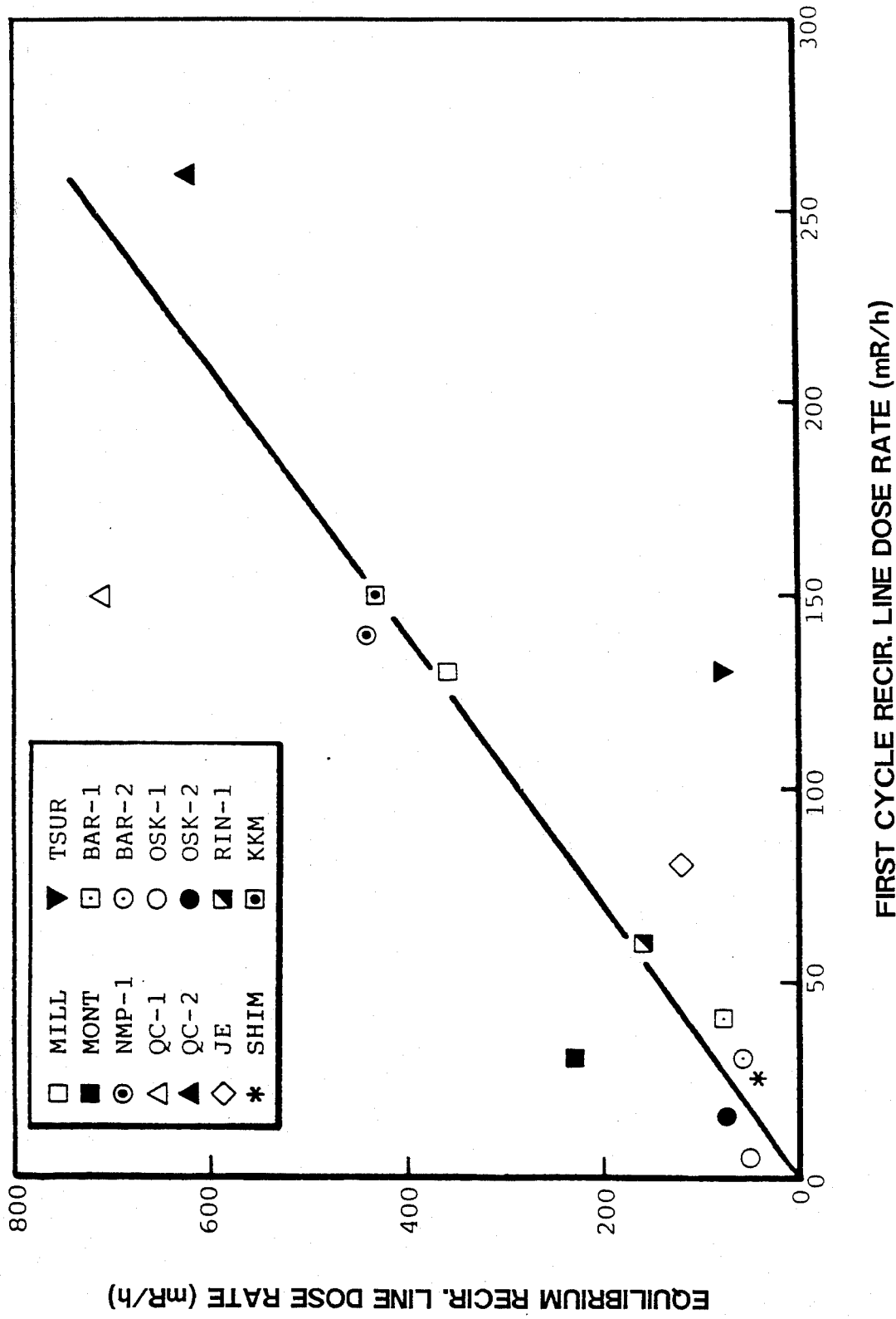
Figure 4:
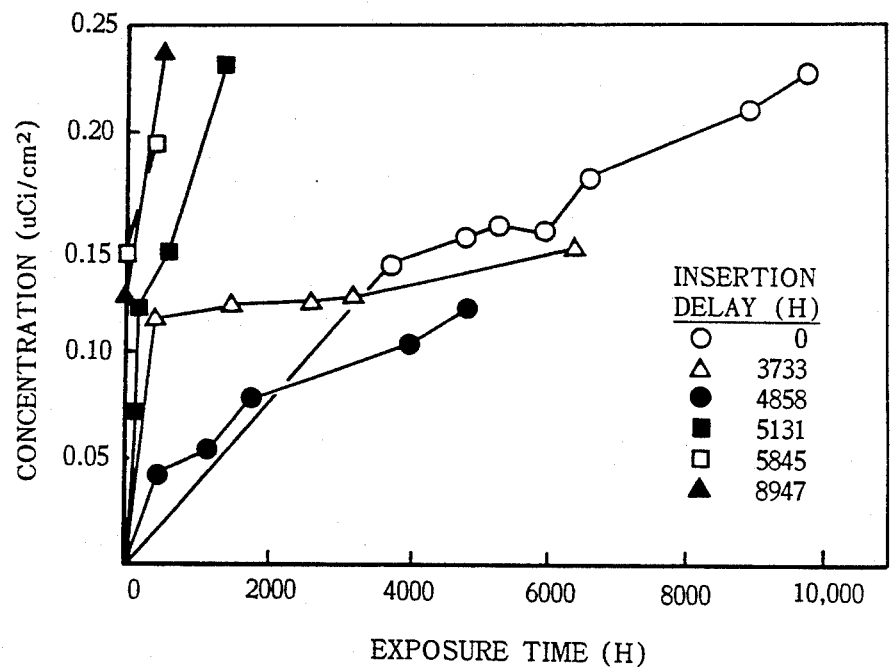
Figure 5:
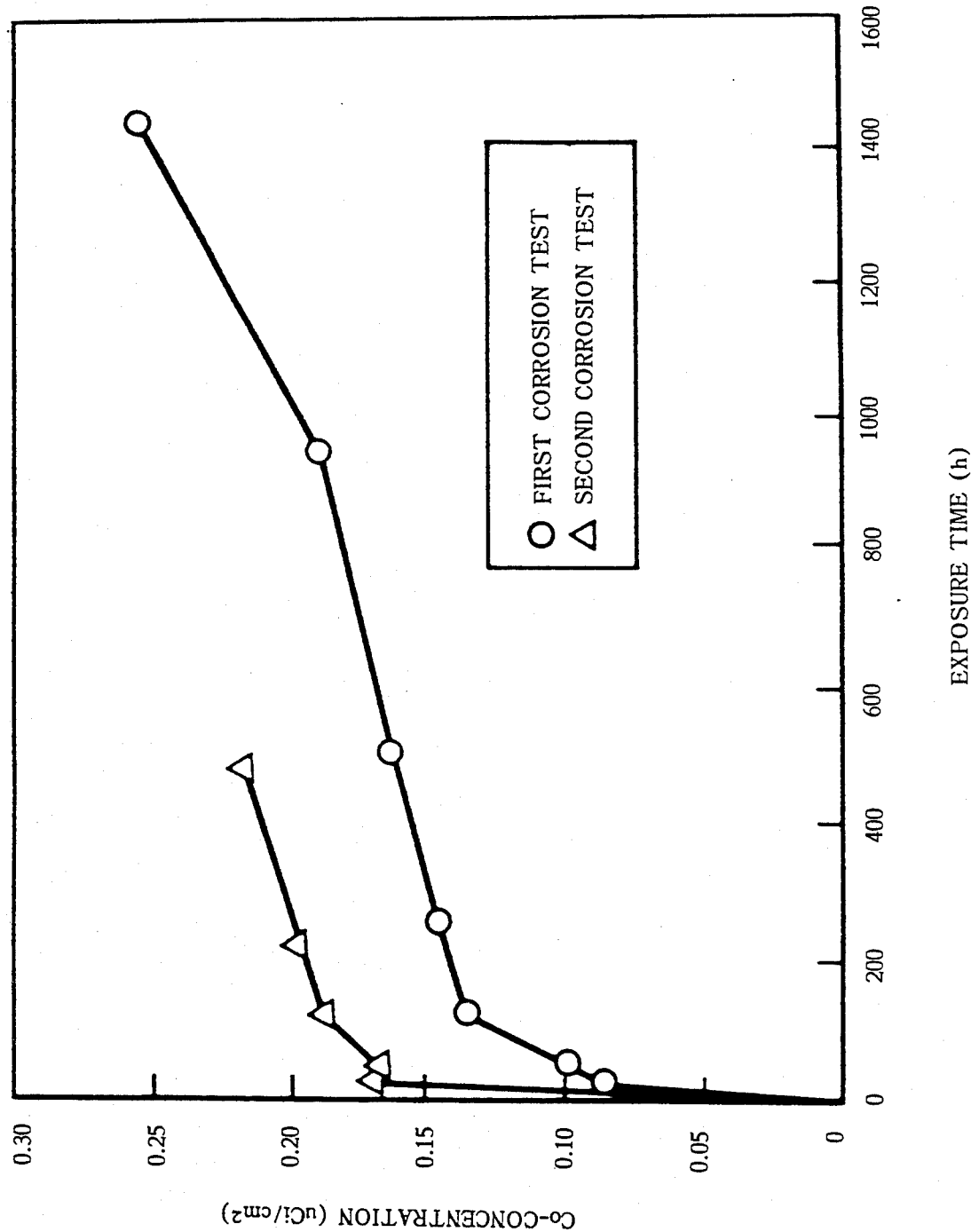
Figure 6:
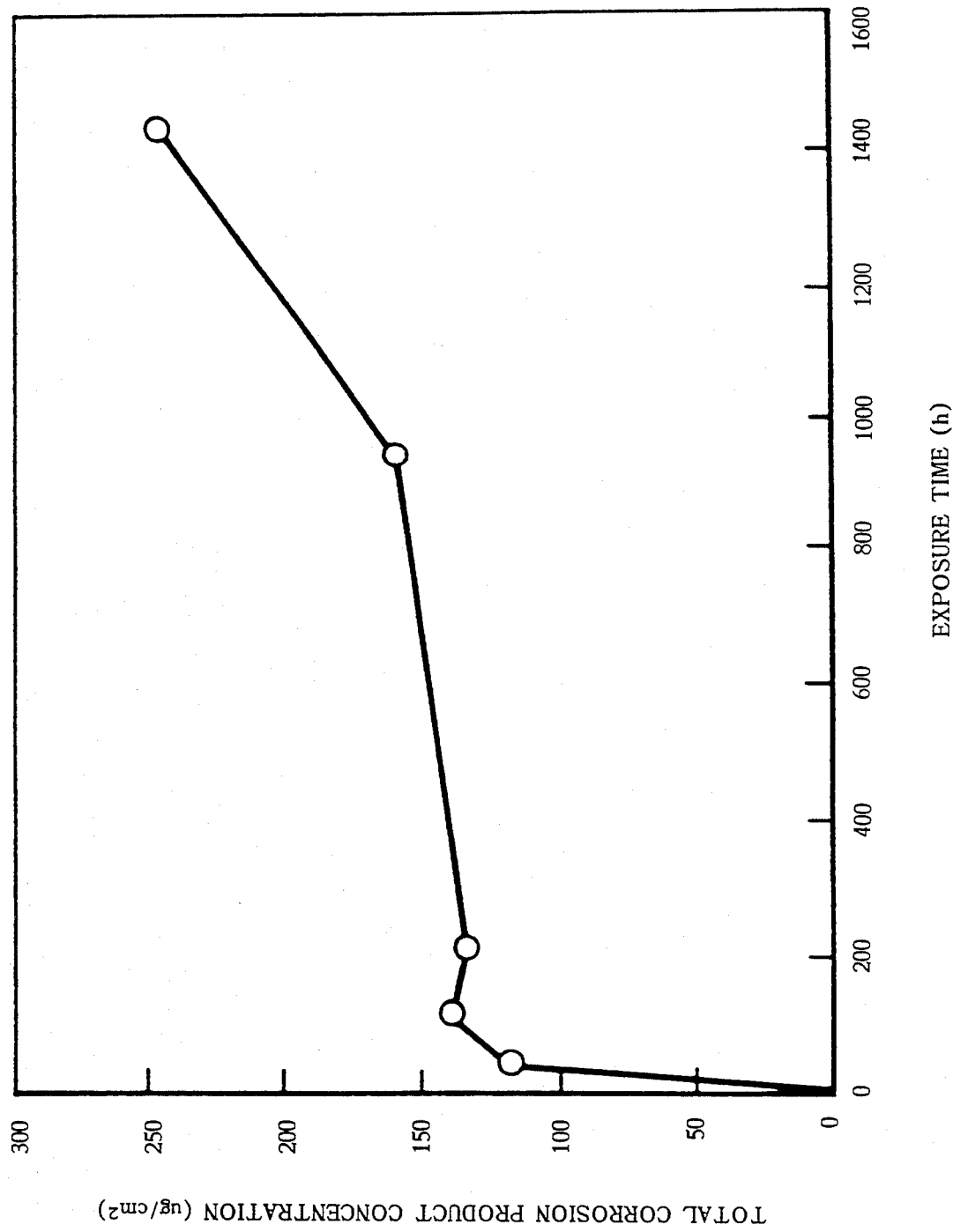
Figure 7:
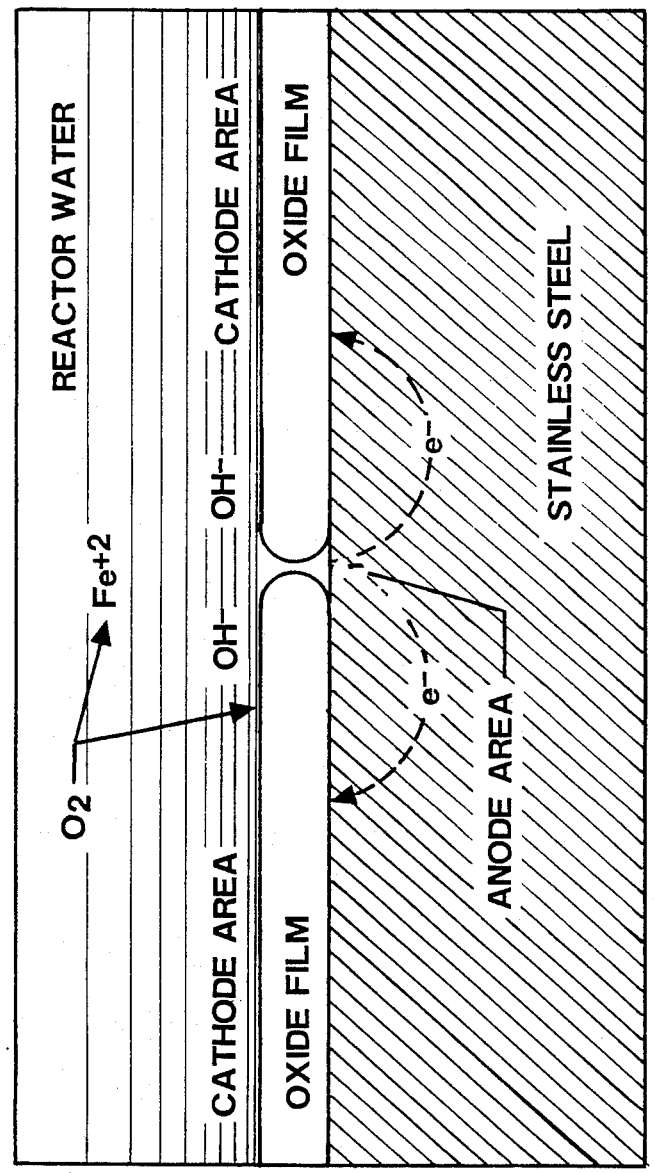
Figure 8:
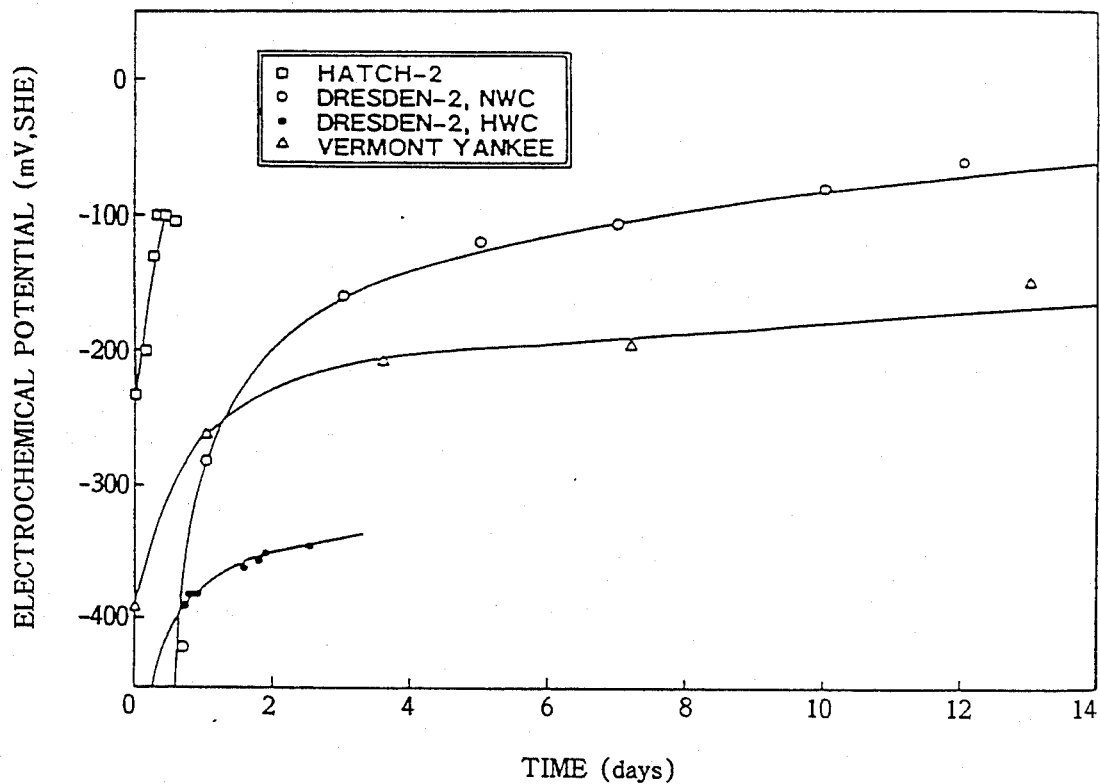
FIGS. 8 and 9 provide a comparison of unprefilmed electrochemical potential data from three plants with the long-term radiation build-up data from those plants.
Figure 10:
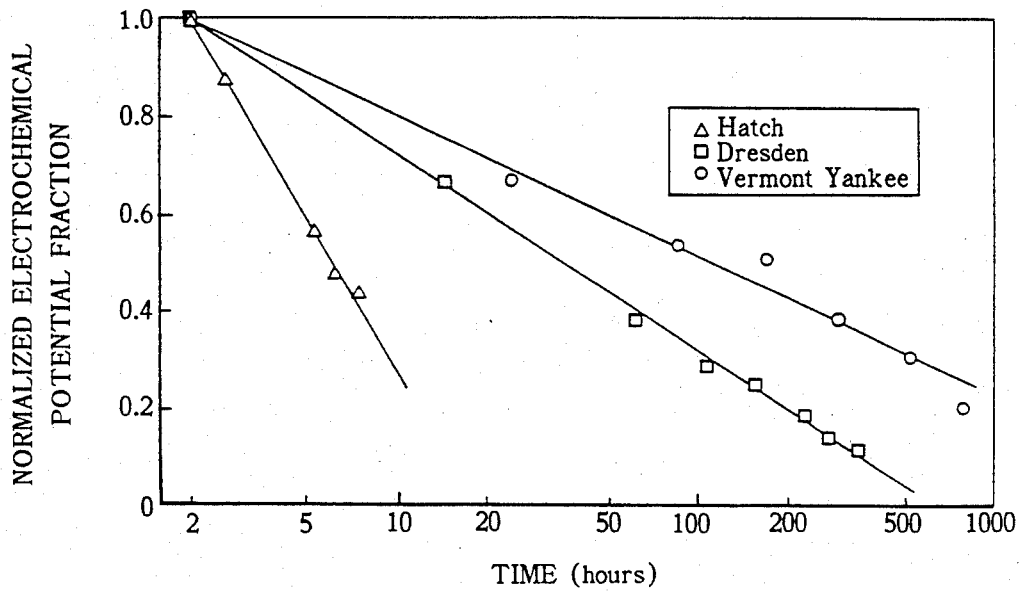

FIG. 10 shows the three approximately linear relationships that are produced if the electrochemical potential data for each plant shown in FIG. 8 are divided by the measured or interpolated electrochemical potential value for each plant after two hours of exposure and these normalized electrochemical potential fractions are plotted versus the logarithm of time (in hours).

Figure 11:
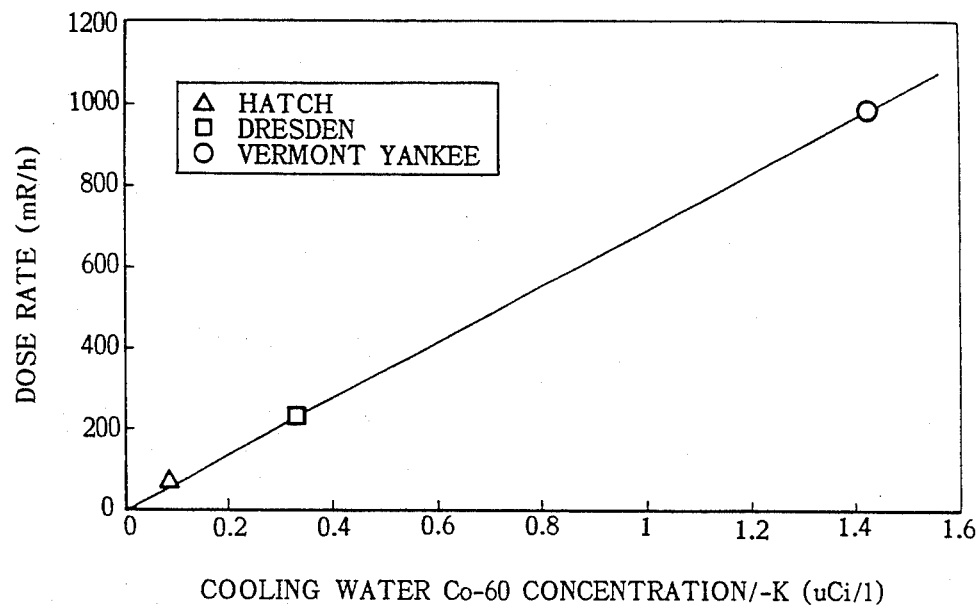

FIG. 11 shows the standard curve that is produced when the measured average concentrations of Co-60 in the cooling water, divided by the negative slopes of the lines shown in FIG. 10, are plotted versus the long-term dose rates for the three plants.

Figure 12:
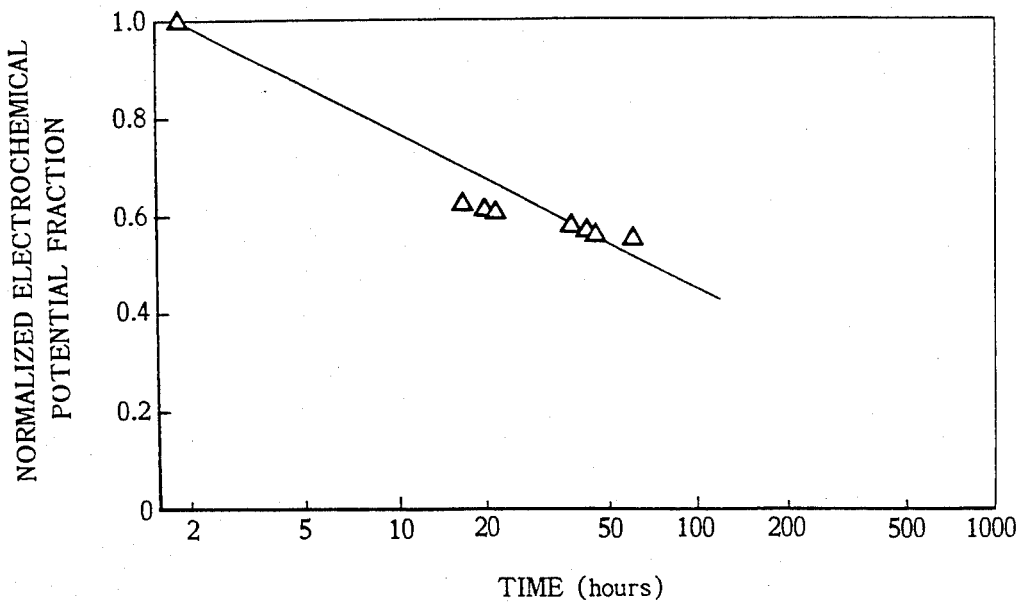

FIG. 12 shows the linear relationships produced when the hydrogen-injection Dresden-2 electrochemical data are divided by the interpolated electrochemical potential value after two hours of exposure and these normalized electrochemical potential fractions are plotted versus the logarithm of time (in hours).

Figure 13:
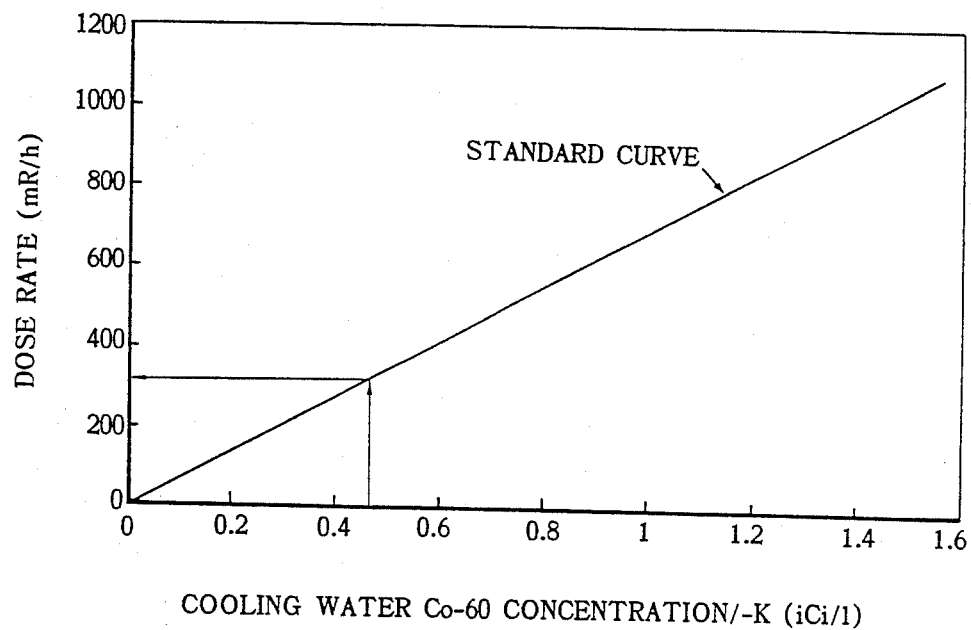

FIG. 13 shows the application of the standard curve presented in FIG. 11 to forecast the long-term Dresden-2 dose rates with hydrogen injection.

DESCRIPTION OF THE PREFERRED EMBODIMENT

Analysis of the radiation build-up data base led to the surprising discovery that the long-term (equilibrium) dose rate is dictated by the early build-up rate, which is determined by current plant conditions and is related to the growth and morphology of the oxide film. Therefore, a physical parameter that is sensitive to the oxide film growth and morphology will provide early indication of what the long-term radiation build-up and dose levels are likely to be. I have discovered that the electrochemical potential of an unprefilmed corroding metal surface is a strong function of the thickness and character of the corrosion film. Therefore, I conclude that the rate of increase in the electrochemical potential, measured with an unprefilmed measuring electrode over a short-term period, should provide a measurement of the morphology of the oxide films and, hence, of radiation build-up rates and the eventual long-term radiation levels from the cooling system of a nuclear power plant.

If the curves in FIGS. 8 and 9 are compared, it is apparent that the Hatch-2 data show the most rapid electrochemical potential increase and the earliest leveling off of the electrochemical potential; and the Hatch-2 plant has the lowest radiation build-up rate and the lowest long-term (equilibrium) radiation levels. Conversely, the Vermont Yankee data show the slowest electrochemical potential increase and latest leveling off of the electrochemical potential, and Vermont Yankee plant has had the most rapid radiation build-up rates and the highest long-term radiation levels. The normal chemistry data (no hydrogen addition) from Dresden-2 lie between the other two plants in regard to both electrochemical potential change and the long-term radiation levels. However, the radiation levels at Dresden-2 have begun to increase since hydrogen has been routinely added (initiated at about 7.6 effective full-power years), and the shape of the hydrogen water chemistry electrochemical potential curve from Dresden-2 seems to resemble the Vermont Yankee electrochemical potential curve.

The discovery of these qualitative relationships prompted me to develop a more quantitative method for predicting long-term radiation dose rates from short-term electrochemical measurements. I discovered that if the electrochemical potential data are normalized by dividing by the measured or interpolated value after a short exposure time and if these normalized electrochemical potential factions are plotted versus the logarithm of time (in hours), an approximately linear relationship is produced for each of the three data sets (see FIG. 10). Any short-time value can be used, as long as the same time is used for all data sets. I further discovered that when I plotted the concentration of Co-60 in the cooling water divided by the negative slopes of these lines versus the long-term dose rates for these plants, I had prepared a standard curve (FIG. 11) that can be used to predict long-term dose rates from any properly determined set of electrochemical measurements that have been normalized to the same short-time value (a two-hour value was used in FIGS. 10 and 11). This standard curve is shown in FIG. 11 with the three points for the three plants where the necessary electrochemical potential data, long-term dose rate data, and Co-60 concentrations are available in the published literature.

The process of data treatment that is a part of this invention can be illustrated by using the short-term electrochemical potential data for hydrogen injection at Dresden-2. These data have been normalized to the two-hour value and plotted versus the logarithm of time in FIG. 12. The slope of the line is −0.325. The average Co-60 concentration at Dresden-2 near the time the electrochemical potential measurements were made was about 0.15 uCi/liter (8). Using the standard curve of FIG. 11, the quotient of these two numbers (0.46 uCi/l) predicts a long-term dose rate for Dresden-2 with hydrogen injection of about 320 mR/h as shown in FIG. 13.

Unfortunately, after only 1.7 effective full-power years of operation with hydrogen injection, the Dresden-2 recirculation lines were decontaminated chemically so the long-term result will never be known. However, at that time of the decontamination, the Dresden-2 dose rate had risen to about 300 mR/h from about 230 mR/h just before hydrogen injection was started. Since the build-up rate is logarithmic with time, it is likely the long-term (equilibrium) dose rate would have been about 320 mR/h.

REFRENCES TO PRIOR ART

1. C. J. Wood, "Recent Developments in LWR Radiation Field Control," *Progress in Nuclear Energy*, Electric Power Research Institute, June 1985.
2. R. A. Shaw and M. D. Naughton, "Radiation Control in Light Water Reactors," Proceedings of an International Conference on Water Chemistry of Nuclear Reactor System 2, Oct. 1980 (page 32).
3. L. D. Anstine and M. Naughton, "Radiation Level Assessment and Control for Boiling Water Reactors," ibid (paper 50).
4. W. E. Berry and R. B. Diegle, "Survey of Corrosion Product Generation, Transport, and Deposition in Light Water Reactors," Electric Power Research Institute, Mar. 1979 (EPRI NP-522).
5. L. D. Anstine, "BWR Radiation Assessment and Control Program: Assessment and Control of BWR Radiation Fields," Electric Power Research Institute, May 1983 (EPRI NP-3114, vol. 2).
6. L. D. Anstine, J. J. Zimmer and T. L. Wong, "BWR Corrosion-Product Transport Survey," Electric Power Research Institute, Sept. 1984 (EPRI NP-3681).
7. W. Marble, "Control of Radiation-Field Buildup in BWRs," Electric Power Research Institute, June 1985 (NP-4072).
8. "BWR Radiation Control Handouts from EPRI Contractors Meeting," Electric Power Research Institute, Nov. 1985.
9. R. S. Greeley, M. H. Lietzke, W. T. Smith, and R. W. Stoughton, "Electromotive Force Studies in Aqueous Solutions at Elevated Temperatures. I. The Standard Potential of the Silver-Silver Chloride Electrode," *Journal of Physical Chemistry*, vol. 64, p. 652, 1980.
10. M. E. Indig and J. E. Weber, "Electrochemical Potential Measurements in a Boiling Water Reactor," Electric Power Research Institute, Nov. 1983 (EPRI NP-3362).
11. J. Leibovitz, W. R. Kassen, W. L. Pearl and S. G. Sawochka, Draft-BWR "In-Plant Measurements of Electrochemical Potentials," Electric Power Research Institute, May 1983 (EPRI NP-3521).
12. E. L. Burley, "Oxygen Suppression in Boiling Water Reactors—Phase 2," General Electric Company, Oct. 1982 (NEDC-23856-7).

As can be seen from the preceding descriptions and discussion, the invention provides an effective method for predicting the long-term radiation level changes that will be associated with the corrosion and films on the interior surfaces of the coolant system piping of a nuclear power plant. Having thus described the invention, what is believed to be new and novel and sought to be protected by letters patent of the United States is as follows:

I claim:

1. The method of determining the long-term radiation levels of a water-cooled nuclear reactor cooling system, comprising the steps of:
   (a) Inserting a dual-electrode electrochemical potential measuring device, including an unprefilmed measuring electrode and a secondary standard electrode, into a continuously flowing sample line from any selected point in the plant cooling system;
   (b) Wherein said electrochemical potential measuring device utilizes at least one unprefilmed measuring electrode fabricated from the same metal as the cooling system;
   (c) Collecting electrochemical potential data beginning immediately after the electrode insertion and continuing over a predetermined measurement period;

(d) Determining the normalized electrochemical potential fractions by dividing each electrochemical potential measurement result by the measured or interpolated electrochemical potential after a prescribed short exposure period;

(e) Determining the slope of the straight line through the data points created by plotting the normalized electrochemical potential fractions versus the logarithm of time in hours;

(f) Dividing the average of the measured values of the Co-60 concentration in the cooling water by the slope determined in step e; and (g) Determining the expected long-term dose rate by using the standard curve of the type shown in FIG. 11 prepared from the data in the prior art and prepared using the said prescribed short exposure period used in step d.

2. The method of determining the effects due to controlled or uncontrolled changes that may have occurred in the water chemistry of a nuclear reactor on the long-term radiation levels from the cooling system of that reactor, comprising the steps of:

(a) Inserting a dual-electrode electrochemical potential measuring device, including an unprefilmed measuring electrode and a secondary standard electrode, into a continuously flowing sample line from any selected point in the plant cooling system;

(b) Wherein said electrochemical potential measuring device utilizes at least one unprefilmed measuring electrode fabricated from the same metal as the cooling system;

(c) Collecting electrochemical potential data beginning immediately after the electrode insertion and continuing over a predetermined measurement period;

(d) Determining the normalized electrochemical potential fractions by dividing each electrochemical potential measurement result by the measured or interpolated electrochemical potential after a prescribed short exposure period;

(e) Determining the slope of the straight line through the data points created by plotting the normalized electrochemical potential fractions versus the logarithm of time in hours;

(f) Dividing the average of the measured values of the Co-60 concentration in the cooling water by the slope determined in step e; and (g) Determining the expected long-term dose rate by using the standard curve of the type shown in FIG. 11 prepared from the data in the prior art and prepared using the said prescribed short exposure period used in step d.

3. The method of determining the effects due to proposed changes in water chemistry and reactor-operational parameters on the long-term radiation levels from a water-cooled nuclear reactor cooling system, comprising the steps of:

(a) Changing temporarily the water chemistry and reactor operational parameters to reflect the proposed changes;

(b) Inserting as dual-electrode electrochemical potential measuring device, including an unprefilmed measuring electrode and a secondary standard electrode, into a continuously flowing sample line from any selected point in the plant cooling system;

(c) Wherein said electrochemical potential measuring device utilizes at least one unprefilmed measuring electrode fabricated from the same metal as the cooling system;

(d) Collecting electrochemical potential data beginning immediately after the electrode insertion and continuing over a predetermined measurement period;

(e) Determining the normalized electrochemical potential fractions by dividing each electrochemical potential measurement result by the measured or interpolated electrochemical potential after a prescribed short exposure period;

(f) Determining the slope of the straight line through the data points created by plotting the normalized electrochemical potential fractions versus the logarithm of time in hours;

(g) Dividing the average of the measured values of the Co-60 concentration in the cooling water by the slope determined in step f; and (h) Determining the expected long-term dose rate by using the standard curve of the type shown in FIG. 11 prepared from the data in the prior art and prepared using the said prescribed short exposure period used in step e.

4. The methods of claims 1, 2, or 3 where the nuclear reactor uses a direct-cycle cooling system with neutral-pH water such as a boiling water reactor.

5. The methods of claims 1, 2, 3, or 4 where the nuclear reactor cooling system is fabricated from type-304 stainless steel, type-316 stainless steel, or low-alloy carbon steel.

6. The methods of claims 1, 2, 3, 4, or 5 where the sample line comes from the recirculation system portion of the cooling system of the nuclear reactor.

7. The methods of claims 1, 2, 3, 4, or 5 where the sample line comes from the reactor water clean-up system portion of the cooling system of the nuclear reactor.

* * * * *